(12) United States Patent
Jahnke et al.

(10) Patent No.: US 8,367,256 B2
(45) Date of Patent: Feb. 5, 2013

(54) WATER RECOVERY ASSEMBLY FOR USE IN HIGH TEMPERATURE FUEL CELL SYSTEMS

(75) Inventors: Fred C. Jahnke, Rye, NY (US); Joseph M. Daly, Bethel, CT (US); Anthony J. Leo, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 346 days.

(21) Appl. No.: 11/971,663

(22) Filed: Jan. 9, 2008

(65) Prior Publication Data

US 2009/0176134 A1 Jul. 9, 2009

(51) Int. Cl.
*H01M 8/04* (2006.01)
*H01M 8/06* (2006.01)

(52) U.S. Cl. ........ 429/414; 429/408; 429/409; 429/413; 429/415

(58) Field of Classification Search ............ 429/17, 429/408, 409, 413, 414, 415
See application file for complete search history.

(56) References Cited

U.S. PATENT DOCUMENTS

| | | | |
|---|---|---|---|
| 3,861,958 A * | 1/1975 | Cheron | 429/415 |
| 4,362,789 A | 12/1982 | Dighe | |
| 4,372,759 A * | 2/1983 | Sederquist et al. | 95/228 |
| 6,171,718 B1 * | 1/2001 | Murach et al. | 429/434 |
| 6,207,306 B1 * | 3/2001 | Sederquist | 429/17 |
| 6,207,308 B1 | 3/2001 | Grasso et al. | |
| 6,759,153 B1 | 7/2004 | Lamm et al. | |
| 6,869,707 B2 | 3/2005 | Edlund et al. | |
| 7,018,732 B2 | 3/2006 | Cargnelli et al. | |
| 7,060,382 B2 | 6/2006 | Jahnke et al. | |
| 7,184,875 B2 | 2/2007 | Ferrall et al. | |
| 2004/0023094 A1 | 2/2004 | Hatayama et al. | |
| 2004/0131902 A1 | 7/2004 | Frank et al. | |
| 2004/0229102 A1 | 11/2004 | Jahnke et al. | |
| 2007/0134526 A1 * | 6/2007 | Numao et al. | 429/22 |
| 2009/0155650 A1 * | 6/2009 | Cui et al. | 429/20 |
| 2011/0250514 A1 * | 10/2011 | Ramaswamy et al. | 429/414 |

FOREIGN PATENT DOCUMENTS

| | | |
|---|---|---|
| WO | 01/67530 A2 | 9/2001 |
| WO | 2005/043658 A2 | 5/2005 |

OTHER PUBLICATIONS

The above references were cited in an International Search Report and Written Opinion of Jan. 8, 2009 issued in the counterpart PCT Patent Application No. PCT/US2009/030416. The International Search Report is enclosed.
The US Publication No. 1 and foreign references were cited in a Supplementary European Search Report issued on Dec. 19, 2011, which is enclosed, that issued in the corresponding European Patent Application No. 09700158.0.
The US Publication No. 1 and foreign references were cited in a Supplementary European Search Report issued on Dec. 19, 2011, which is enclosed, that issued in the corresponding European Patent Application No. 09717213.4.
The above US Patents and US Publication Nos. 2-3 were cited in a Sep. 14, 2011 U.S. Office Action, which is enclosed, that issued in U.S. Appl. No. 12/042,231.

* cited by examiner

*Primary Examiner* — Patrick Ryan
*Assistant Examiner* — Ladan Mohaddes
(74) *Attorney, Agent, or Firm* — Cowan, Liebowitz & Latman, P.C.

(57) ABSTRACT

A water recovery assembly for use in a fuel cell system having an anode and a cathode, the anode being adapted to receive fuel and output anode exhaust, the water recovery assembly comprising a first cooling assembly adapted to receive and quench cool the anode exhaust and to recover a first portion of water including electrolyte from the anode exhaust, and to output quenched anode exhaust and the first portion of water, and a second cooling assembly adapted to receive the quenched anode exhaust and to recover a second portion of water from the quenched anode exhaust, the second portion of water being suitable for humidifying the fuel supplied to the anode.

26 Claims, 2 Drawing Sheets

WATER RECOVERY ASSEMBLY FOR USE IN HIGH TEMPERATURE FUEL CELL SYSTEMS

BACKGROUND OF THE INVENTION

This invention relates to water recovery and, in particular, to water recovery for use in high temperature fuel cell systems.

A fuel cell is a device which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions. High temperature fuel cells, such as molten carbonate fuel cells, operate by passing a reactant fuel gas through the anode, while oxidant gas comprising carbon dioxide and oxygen is passed through the cathode.

Reactant gases supplied to the fuel cell, and in particular, the reactant fuel gas supplied to the anode, must be sufficiently humidified to maintain a desired steam to carbon ratio in the fuel for proper and efficient fuel cell operation and to prevent carbon deposition in the fuel cell. The amount of water consumed by fuel cell system for humidifying reactant gases is usually significant and requires a continuous supply of water to the fuel cell system.

The electrochemical reaction between the reactant fuel gas and the oxidant gas produces water vapor outputted as part of a heated anode exhaust gas, which also comprises excess fuel not consumed by the fuel cell and $CO_2$. In order to limit or eliminate water supplied to the fuel cell system from external sources, it is desired to separate water vapor in the anode exhaust gas from other anode exhaust components and to recycle the separated water to humidify the reactant gases. Water recovery from the system exhaust is possible through the use of condensing heat recovery heat exchangers. However, the amount of water recovered will depend on the local ambient temperature and humidity levels, and the recovered water is usually insufficient to support fuel cell operation in many high temperature locations. Water recovery from the more humid anode exhaust gas is usually more efficient over a wider range of ambient temperatures.

An example of such water recycling is disclosed in U.S. Pat. Nos. 5,068,159 and 5,039,579, which teach using a cooler and condenser to separate water from the anode exhaust stream, and thereafter passing the separated water through a boiler and a heater and feeding the water to the inlet of the anode compartment.

Another U.S. Pat. No. 7,060,382, assigned to the same assignee hereof, discloses a system in which a water transfer assembly in the form of a partial-pressure swing water transfer wheel is used to separate and transfer water vapor in anode exhaust as water to the fuel feed. This patent also discloses a system in which this transfer is carried out by using heat exchangers where the anode exhaust is cooled by the oxidant supply gas, water recycle vaporization and/or a cooling water or ambient air-cooled heat exchanger (air fan). After being cooled, the stream is fed to a scrubbing and blow-down assembly where the electrolyte contaminated water is removed. The resultant stream is then further cooled in a heat exchanger by an air fan or cooling water and the stream then fed to a condensing unit. At this unit, the water is removed and fed to the fuel feed, while the stream is further fed to a carbon dioxide transfer assembly.

Conventional systems for separating water in the anode exhaust employ complex and costly cooling systems with heat exchangers to achieve sufficient cooling of the hot anode exhaust gas leaving the anode in order to condense a sufficient amount of water from the anode exhaust. This results in significant power consumption, greatly increasing the operating costs of the system. The costs of cooling the anode exhaust gas to separate the water from the other anode exhaust components is particularly significant in warmer and more humid climates, in which anode exhaust must be cooled below ambient temperature in order to obtain sufficient condensation and a sufficient amount of water for use in humidifying the reactant gases.

It is therefore an object of the present invention to provide an improved water recovery assembly capable of separating and transferring water from anode exhaust gas without requiring significant power for operation.

It is another object of the present invention to provide a water recovery assembly which produces water free of electrolyte, thus eliminating the need for a water treating system.

It is a further object of the present invention to provide a water recovery assembly which results in greater manufacturing and operating efficiencies in the fuel cell system.

SUMMARY OF THE INVENTION

The above and other objectives are realized in a water recovery assembly for use in a fuel cell system having an anode adapted to receive fuel and to output anode exhaust, and a cathode. The water recovery assembly comprises a first cooling assembly adapted to receive and quench cool the anode exhaust to recover a first portion of water including electrolyte from the anode exhaust and to output quenched anode exhaust and the first portion of water. The water recovery assembly also includes a second cooling assembly adapted to receive the quenched anode exhaust and to recover a second portion of water from the quenched anode exhaust, the second portion of water being suitable for humidifying the fuel supplied to the anode.

In certain illustrative embodiments, the first cooling assembly comprises a quench assembly for passing the anode exhaust therethrough and which is adapted to receive a predetermined amount of spray water for quench cooling the anode exhaust and condensing the first portion of water from the anode exhaust. The first cooling assembly also includes a recycle path for recycling the first portion of water from the quench assembly and a blowdown assembly for removing the electrolyte from the first portion of water and outputting the resultant water as spray water for use in the quench assembly.

In certain embodiments, the second cooling assembly comprises a packed tower which is adapted to receive the quenched anode exhaust at a first end and to receive recycled water at a second end. The quenched anode exhaust flows from the first end toward the second end, while the recycled water flows from the second end toward the first end. In such embodiments, separated water comprising the second portion of water recovered from the quenched anode exhaust and the recycled water are collected at or close to the first end of the packed tower and outputted from the packed tower. All or a portion of the separated water outputted from the packed tower may be provided to a humidifier assembly of the fuel cell system for humidifying the fuel supplied to the anode.

In certain embodiments, the second cooling assembly also includes a recycle path for passing a predetermined portion of the separated water outputted from the packed tower to the second end of the packed tower for use as the recycled water. In such embodiments, the recycle path includes a heat exchanger for further cooling the predetermined portion of the separated water before passing it to the packed tower.

A water recovery method for use in a fuel cell system and a fuel cell system employing the water recovery assembly are also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
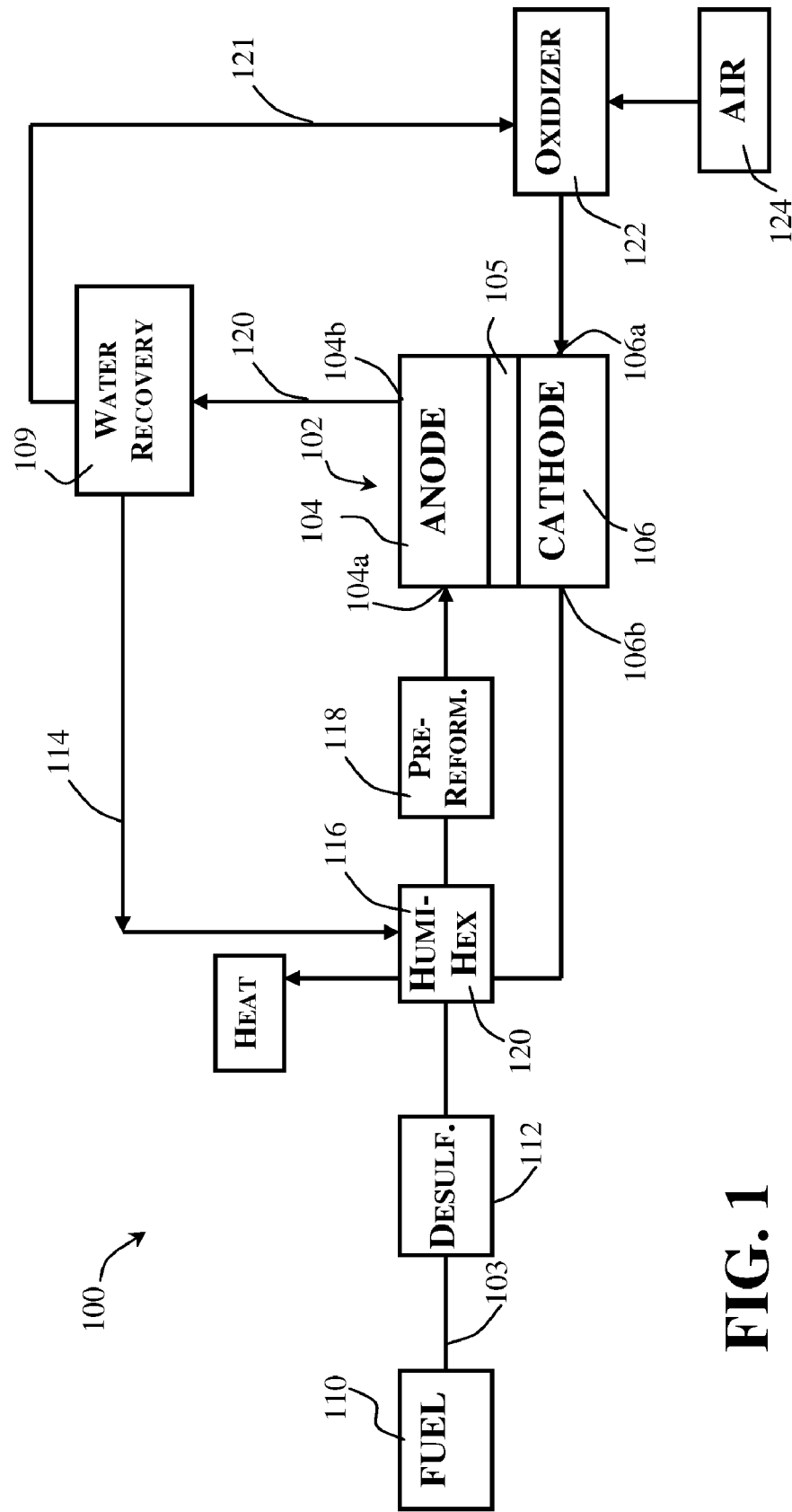
FIG. 1 shows a block diagram of a fuel cell system using a water recovery assembly for recovering water from anode exhaust.

FIG. 1 shows a fuel cell system 100 comprising a fuel cell stack 102 including an anode side 104, adapted to receive fuel from a fuel supply path 103 and to output anode exhaust, and a cathode side 106 adapted to receive oxidant gas and to output cathode exhaust, and a water recovery assembly 109 for recovering water in the anode exhaust to humidify the fuel in the fuel supply path 103 and for outputting water-separated anode exhaust. More particularly, the fuel cell stack 102 of the system 100 comprises at least one fuel cell having the anode side or compartment 104 and the cathode side or compartment 106, separated by an electrolyte matrix 105. A hydrocarbon containing fuel is supplied from a fuel supply 110 to a fuel supply path 103 which carries the fuel through a desulfurizer 112, which removes sulfur-containing compounds present in the fuel.

The desulfurizer 112 comprises one or more sulfur-adsorbent or sulfur-absorbent beds through which the fuel flows and which adsorb or absorb any sulfur-containing compounds in the fuel. After being passed through the desulfurizer 112, the fuel in the supply line 103 is conveyed to a humidifier/heat exchanger assembly 116 which is adapted to receive water from the water recovery assembly 109 via a water supply line 114. In the humidifier/heat exchanger assembly 116, the fuel is mixed with water to produce humidified fuel and pre-heated to a predetermined temperature using hot cathode exhaust. The pre-heated humidified fuel is then passed through a deoxidizer/preconverter or pre-reformer unit 118, which removes any trace oxygen and heavy hydrocarbon contaminants from the fuel. Although not shown in FIG. 1, after passing through the deoxidizer/preconverter or prereformer unit 118, the fuel may be further heated by cathode exhaust. The pre-heated deoxidized humidified fuel is then supplied to the anode side 104 of the fuel cell through an inlet 104a.

Fuel entering the anode side 104 is reformed therein to produce hydrogen and carbon monoxide and undergoes an electrochemical reaction with oxidant gas passing through the cathode side 106 to produce electrical power and water. Anode exhaust gas produced in the anode 104 leaves the fuel cell 102 through an anode outlet 104b into an anode exhaust path 120. The anode exhaust gas in the exhaust path 120 comprises unreacted fuel, including hydrogen and carbon monoxide, water vapor, carbon dioxide, small or trace amounts of electrolyte vapor and trace amounts of other gases.

As shown in FIG. 1, the anode exhaust in the exhaust path 120 is conveyed to the water recovery assembly 109 in which the anode exhaust gas is cooled and water is separated from the other components of the anode exhaust. As discussed herein below, the water recovery assembly condenses the water in the anode exhaust gas in two stages, such that water including substantially all of the electrolyte is first condensed and removed from the water recovery assembly in a first stage, permitting clean water (water substantially electrolyte-free) to be condensed from the anode exhaust in a second stage. The construction of the water recovery assembly is shown in FIG. 2 and will be described in more detail herein below.

Clean water separated from the anode exhaust in the water recovery assembly is passed to the water supply path 114 and thereafter passed to the humidifier/heat exchanger 118 for humidifying the fuel. Separated anode exhaust outputted by the water recovery assembly comprises primarily hydrogen, CO and $CO_2$ with small amounts of water and trace amounts of unconverted hydrocarbons, such as methane. In the illustrative embodiment shown in FIG. 1, the separated anode exhaust is carried from the water recovery assembly 109 by the anode exhaust path 121 to an oxidizer 122, which also receives oxidant gas in the form of air from an air supply 124. In the oxidizer 122, oxidant gas is mixed with the separated anode exhaust and combusted to produce heated oxidant gas and carbon dioxide. Heated oxidant gas leaving the oxidizer 122 is thereafter conveyed to the cathode side 106 through a cathode inlet 106a. Depleted oxidant gas exits the cathode 106 through a cathode outlet 106b and then flows through the humidifier/heat exchanger 116 where heat from the exhausted oxidant gas is transferred to pre-heat the fuel and water mixture.

Figure 2:
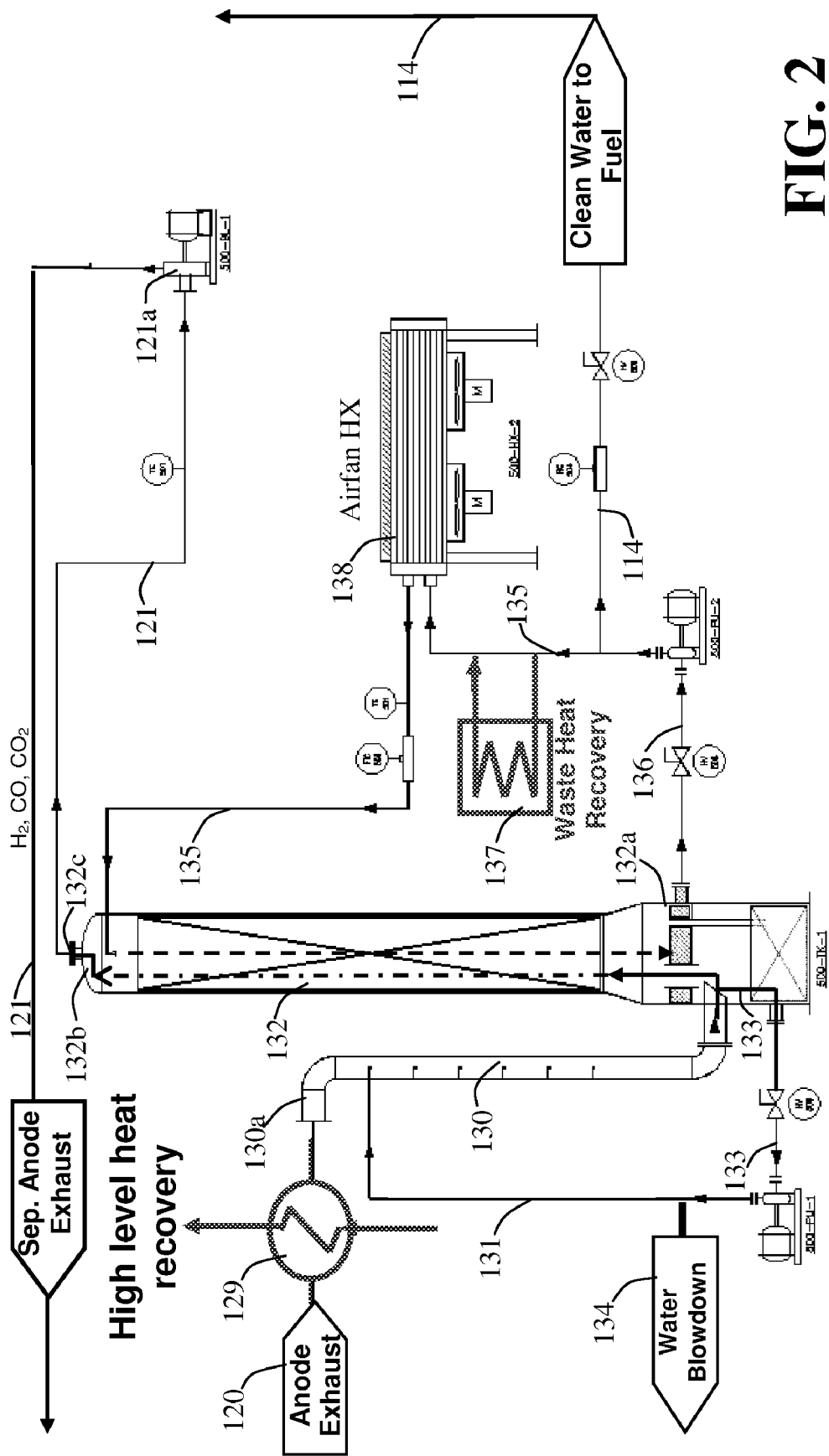
FIG. 2 shows a detailed view of the water recovery assembly of FIG. 1.

FIG. 2 shows a more detailed schematic view of the water recovery assembly 109 of FIG. 1. The water recovery assembly 109 condenses water in the anode exhaust gas in two stages so as to remove water with substantially all of the electrolyte and any debris in a first condensation stage so as to permit transfer of substantially electrolyte-free water from the anode exhaust in a second condensation stage. The water recovery assembly in FIG. 2 includes a cooling path 130 for quench cooling the anode exhaust so as to condense and recover a first portion of the water in the anode exhaust that includes substantially all of the electrolyte and any debris in the first condensation stage and a packed tower assembly 132 for condensing a second portion of the water in the anode exhaust in the second condensation stage. The second portion of the water recovered from the anode exhaust, which is substantially electrolyte-free and debris-free, is then used to humidify the fuel supplied to the fuel cell.

As shown, the anode exhaust gas in the exhaust path 120 is conveyed to the water recovery assembly 109 and may be first passed through a heat exchanger 129 for high level heat recovery from the anode exhaust before being conveyed to the cooling path 130. However, it is understood that the heat exchanger 129 is optional and that in other embodiments of the water recovery assembly 109, the anode exhaust may be passed from the exhaust path 120 directly to the cooling path 130 without being first passing through a heat exchanger. In high-temperature fuel cell systems, such as molten carbonate fuel cell systems, the temperature of the anode exhaust entering the water recovery assembly 109 is about 1000-1110° F.

The cooling path 130 of the water recovery assembly 109 comprises a quench assembly formed from a downward facing pipe and adapted to receive the hot anode exhaust gas from the anode exhaust path 120 and downward facing spray water from a spray water supply path 131. In the cooling path 130, the hot anode exhaust gas is quench cooled using a predetermined amount of spray water supplied to the quench assembly. The amount and temperature of the spray water provided to the quench assembly 130 are selected such that the first portion of the water in the anode exhaust is condensed from the anode exhaust gas. This first portion of the water, as discussed above, contains substantially all of the carbonate electrolyte, such as $K_2CO_3$, and any debris, and is therefore possibly unsuitable for humidifying the fuel supplied to the fuel cell. Accordingly, the first portion of the water is outputted from the quench assembly 130 to a water exhaust path 133. In this way, substantially all of the electrolyte is removed from the anode exhaust with the first portion of the water, thus reducing the risk of damage to the humidifier and the downstream preformer and fuel cell.

In the illustrative embodiment shown in FIG. 2, the quench assembly 130 comprises a down flow pipe wherein the anode exhaust flows from a higher elevation to a lower elevation through the cooling path. The spray water is supplied from the spray water supply path 131 at or near a top portion 130a of the quench assembly 130 so as to quench the anode exhaust as it enters, or soon after it enters, the quench assembly 130. The use of spray water as shown in FIG. 2 to quench the anode exhaust gas boosts the pressure of the anode exhaust gas, resulting in a reduced pressure difference between the anode side 104 and the cathode side 106 of the fuel cell 102. Such reduced pressure difference, in turn, minimizes possible leakage of the fuel gas from the anode inlet 104a into the cathode inlet 106a of the fuel cell 102. In certain embodiments, a booster blower may be provided in the anode exhaust path 120 to further increase the pressure of the anode exhaust and to control the pressure difference between the anode and the cathode sides of the fuel cell 102, thus maintaining the pressure at an optimum pressure.

In the embodiment shown in FIG. 2, the electrolyte-containing first water portion in the water exhaust path 133 is cleaned using a water blowdown technique 134 which removes electrolyte from the water by discharging blowdown water. In addition, the first water portion in the exhaust path is replenished by, or combined with, water generated by condensation of humidity in the anode exhaust gas in the packed tower 132, as discussed more fully herein below. While some of the water in the exhaust path 133 is discharged as a result of water blowdown in line 134, the main portion of the water is thereafter provided to the spray water supply path 131 to be used as spray water for quenching the anode exhaust. In this way, the cooling spray water is recycled back to the quench assembly 130, thus reducing or eliminating the need for cooling spray water from outside sources.

After the first water portion is separated from the anode exhaust in the quench assembly 130 and sent to path 133, quenched anode exhaust is outputted from the quench assembly 130 to the packed tower assembly 132. The quenched anode exhaust entering the packed tower has a temperature of about 190-200° F. The packed tower assembly includes a packed tower which is typically made of stainless steel with conventional packing such as Pall rings, Raschig rings, or saddles, also made from stainless steel. The packed tower assembly 132 is supplied with cooled recycled water having a temperature of about 100° F. from a water recycle path 135.

As shown, the quenched anode exhaust is provided to the packed tower at or near a first end 132a of the packed tower 132, while the cooled recycled water is provided at or near a second end 132b of the packed tower 132, so that the quenched anode exhaust and the cooled recycled water flow in opposing directions relative to one another. In the present illustrative embodiment, the first end 132a of the packed tower 132 is a lower-most end of the tower, while the second end 132b is the upper-most end of the packed tower 132, such that the cooled recycled water travels downwardly through the tower 132 toward the first end 132a, while the anode exhaust gas travels upwardly through the tower toward the second end 132b.

In the packed tower 132, the quenched anode exhaust is cooled by direct contact with the recycled water in the packed tower assembly 132, and a second portion of the water, comprising all or a substantial portion of the remaining water vapor in the quenched anode exhaust, is separated from the quenched anode exhaust by condensation. The second portion of the water condensed from the quenched anode exhaust is mixed with the recycled water as it travels through the packed tower 132. Separated water, which comprises a mixture of second water portion condensed from the anode exhaust and the recycled water, is conveyed through the packed tower 132 toward the first end 132a of the tower 132.

Separated anode exhaust, comprising the remaining components, e.g. hydrogen, carbon monoxide and $CO_2$, travels toward the second end 132b of the packed tower and is outputted from the tower 132 to a dehumidified gas connecting path 121. In particular, the separated exhaust in the illustrative embodiment of FIG. 2 is outputted to the dehumidified gas connecting path 121 from an outlet 132c at or near the second end 132b of the packed tower 132. The separated anode exhaust is thereafter conveyed through the dehumidified gas connecting path 121 to the oxidizer 122 of the fuel cell system. In certain embodiments, a booster blower 121a is included in the connecting path 121 to control the pressure at the fuel cell anode 104, and in particular, to control the pressure at the fuel cell anode 104 relative to the pressure at the fuel cell cathode 106.

As shown in FIG. 2, the separated water, which includes the second portion of the water condensed from the quenched anode exhaust, is collected in a water collecting vessel or compartment at or near the first end 132a of the tower and is outputted from the packed tower 132 to a water output path 136. Additionally, excess water overflows the collecting vessel or compartment at the first end 132a of the tower and is transferred to the water stream in the exhaust path 133 to subsequently be used as quench water in the spray water supply path 131, as discussed herein above. Alternatively, a predetermined portion of the separated water may be transferred to the exhaust path 133 for use as the quench water. The temperature of the separated water in the water output path 136 is between 120° F. and 160° F. As shown, the water output path 136 is coupled with the recycle path 135, and a predetermined portion of the separated water is conveyed from the water output path 136 to the recycle path 135 for use as the recycled water.

In the illustrative embodiment shown, the predetermined portion of the separated water conveyed to the water recycle path 135 may first be used in waste heat recovery 137 which recovers heat stored in the separated water and cools the separated water. The predetermined portion of the separated water is thereafter passed from the waste heat recovery 137 to a heat exchanger 138 where it is further cooled to about 100° F. In the embodiment shown in FIG. 2, the heat exchanger 138 comprises an air fan heat exchanger. However, any other suitable heat exchanger may be used for cooling the water. After the predetermined portion of the separated water is cooled in the heat exchanger 138, the water is passed via the water recycle path 135 to the second end 132b of the packed tower 132 where it is used as the cooled recycled water.

The remaining portion of the separated water in the water output path 136 that is not conveyed to the recycle path 135 is outputted from the water recovery assembly 109 to the water supply path 114. As discussed above, the water supply path 114 conveys the separated water to the humidifier/heat exchanger 116 to humidify the fuel supplied to the system 100. The separated water supplied to the humidifier/heat exchanger 116 is clean water substantially electrolyte-free since any, or essentially all, electrolyte is removed from the system with the first portion of the water in the first stage of the water recovery. Accordingly, additional water treating facilities are not required for removal of electrolyte from the separated water before it is suitable for use in humidifying the fuel supplied to the system, although a small resin bed polisher system (not shown) may be used during start up or to prevent upset conditions in the system.

The water recovery assembly 109 shown in FIG. 2 sufficiently cools the anode exhaust so as to condense a sufficient amount of water from the anode exhaust to allow water-independent or substantially water-independent operation of the fuel cell system. In particular, the water recovery assembly 109 is capable of cooling the quenched anode exhaust to 140° F. or less, which results in sufficient condensation, even in high ambient temperature conditions.

In water-independent operation of the system, all of the water supplied to the humidifier/heat exchanger is provided from the anode exhaust by the water recovery assembly 109, a portion of the separated water from the packed tower 132 provides the recycled water for use in the packed tower 132, and excess water from the packed tower 132 overflows to be combined with the first water portion in the exhaust path 133 and to become quench water in the quench assembly 130. Although not shown in FIG. 2, excess water may be produced by the water recovery assembly 109 due to production of water in the fuel cell as a result of the electrochemical reaction. In such cases, excess water, that is not needed for humidifying the fuel or for other operations of the fuel cell system, is exported from the system and/or stored for future use.

As mentioned above, the use of spray water in the quench assembly during the first condensation stage results in a pressure increase of the anode exhaust and minimizes the pressure difference between the anode and cathode. The system employing the water recovery assembly of FIG. 2, therefore, is capable of operating without an anode booster blower, typically required in conventional systems. In addition, if the system that uses the water recovery assembly 109 of FIG. 2 includes an anode booster blower, the system is capable of continuing operation substantially unaffected in an event of anode booster blower failure. The reduction in the pressure difference between the anode and the cathode and the resulting reduction in fuel leakage in the fuel cell system of FIG. 1 results in greater reliability and efficiency of the system. Moreover, the elimination of complex and expensive equipment such as a water treating system, result in further reliability and efficiency of the fuel cell system.

Additional efficiencies may be provided in the fuel cell system of FIG. 1 through heat management and by using hot anode and cathode exhaust gases to preheat the fuel and oxidant gases supplied to the fuel cell 102. For example, in order to offset the amount of heat removed from the anode exhaust in the water recovery assembly 109 to condense the water in the anode exhaust, the oxidant gas supplied to the fuel cell system may be pre-heated using hot cathode exhaust. Similarly, the high level heat recovery 129 from the anode exhaust in the water recovery assembly may be used to pre-heat the oxidant gas and/or the fuel gas supplied to the fuel cell. In this way, the amount of electrical or burner air heating required for pre-heating of the oxidant and fuel gases supplied to the fuel cell is minimized.

In all cases it is understood that the above-described arrangements are merely illustrative of the many possible specific embodiments which represent applications of the present invention. For example, the quench assembly may be formed as a cooling tower adapted to receive the hot anode exhaust gas and spray water. Numerous and varied other arrangements can be readily devised in accordance with the principles of the present invention without departing from the spirit and scope of the invention.

What is claimed is:

1. A water recovery assembly for use in a molten carbonate fuel cell system having an anode and a cathode, said anode is adapted to receive fuel and to output anode exhaust, said water recovery assembly comprising:
    a first cooling assembly receiving and quench cooling said anode exhaust to recover a first portion of water including electrolyte from said anode exhaust and to output quenched electrolyte-free anode exhaust and electrolyte-containing water including said first portion of water, said first cooling assembly comprising:
    a quench assembly including a downward facing path passing said anode exhaust therethrough, and one or more spray water units injecting predetermined amount of spray water into the downward facing path for quench cooling said anode exhaust and condensing said first portion of water from said anode exhaust, and
    a recycling assembly comprising a blowdown assembly discharging a portion of the electrolyte-containing water outputted from said quench assembly to remove electrolyte and a recycle path recycling remaining water outputted from said quench assembly to said quench assembly for use as spray water; and
    a second cooling assembly comprising a packed tower which receives said quenched anode exhaust from the first cooling assembly and recovers a second portion of water from said quenched anode exhaust, said second portion of water being substantially free of electrolyte and suitable for humidifying said fuel supplied to said anode;
    wherein the water recovery assembly is part of the molten carbonate fuel cell system.

2. A water recovery assembly in accordance with claim 1, wherein said packed tower is adapted to receive said quenched anode exhaust at a first end and to receive recycled water at a second end, wherein said quenched anode exhaust flows from said first end toward said second end and said recycled water flows from said second end toward said first end.

3. A water recovery assembly in accordance with claim 2, wherein said first end is a lowermost end of said packed tower and said second end is an upper most end of said packed tower.

4. A water recovery assembly in accordance with claim 3, wherein separated water comprising said second portion of water recovered from said quenched anode exhaust and said recycled water are collected at or close to said first end of said packed tower and outputted from said packed tower.

5. A water recovery assembly in accordance with claim 4, wherein said fuel cell system includes a humidifier assembly for humidifying said fuel supplied to said anode, and wherein all or a portion of said separated water is outputted from said packed tower to said humidifier assembly for humidifying said fuel.

6. A water recovery assembly in accordance with claim 4, wherein said recycle path passes a predetermined portion of said separated water outputted from said packed tower to said second end of said packed tower for use as said recycled water.

7. A water recovery assembly in accordance with claim 6, wherein said recycle path includes a heat exchanger for further cooling said predetermined portion of said separated water before passing said separated water to said packed tower.

8. A water recovery assembly in accordance with claim 1, further comprising a heat exchanger upstream from said first cooling assembly for recovering heat from said anode exhaust before passing said anode exhaust to said first cooling assembly.

9. A water recovery assembly in accordance with claim 2, wherein said packed tower outputs separated anode exhaust from said second end after recovering said second portion of water from said anode exhaust.

10. A water recovery assembly in accordance with claim 4, wherein a portion of said separated water is outputted from said packed tower to said recycle path of said first cooling assembly for mixing with said first portion of water.

11. A molten carbonate fuel cell system comprising:
at least one molten carbonate fuel cell including an anode for receiving fuel and outputting anode exhaust and a cathode for receiving oxidant gas and outputting cathode exhaust;
a humidifier assembly for humidifying said fuel supplied to said anode; and
a water recovery assembly comprising:
a first cooling assembly for receiving and quench cooling said anode exhaust to recover a first portion of water including electrolyte from said anode exhaust and to output electrolyte-free quenched anode exhaust and electrolyte-containing water including said first portion of water, said first cooling assembly comprising:
a quench assembly including a downward facing path passing said anode exhaust therethrough, and one or more spray water units injecting predetermined amount of spray water into the downward facing path for quench cooling said anode exhaust and condensing said first portion of water from said anode exhaust, and
a recycling assembly comprising a blowdown assembly discharging a portion of the electrolyte-containing water outputted from said quench assembly to remove electrolyte and a recycle path recycling remaining water outputted from said quench assembly to said quench assembly for use as spray water, and
a second cooling assembly comprising a packed tower which receives said quenched anode exhaust from the first cooling assembly and recovers a second portion of water from said quenched anode exhaust, the second portion of water being substantially free of electrolyte, and outputs at least a portion of said second portion of water to said humidifier for humidifying said fuel supplied to said anode.

12. A molten carbonate fuel cell system in accordance with claim 11, wherein said packed tower is adapted to receive said quenched anode exhaust at a first end and to receive recycled water at a second end, wherein said quenched anode exhaust flows from said first end toward said second end and said recycled water flows from said second end toward said first end.

13. A molten carbonate fuel cell system in accordance with claim 12, wherein said first end is a lowermost end of said packed tower and said second end is an uppermost end of said packed tower.

14. A molten carbonate fuel cell system in accordance with claim 13, wherein separated water comprising said second portion of water recovered from said quenched anode exhaust and said recycled water is collected at or close to said first end of said packed tower and outputted from said packed tower.

15. A molten carbonate fuel cell system in accordance with claim 14, wherein said recycle path is adapted to receive a first predetermined portion of said separated water outputted from said packed tower and to provide said predetermined portion of said separated water to said second end of said packed tower for use as the recycled water, and wherein a second predetermined portion of said separated water is outputted to said humidifier.

16. A molten carbonate fuel cell system in accordance with claim 15, wherein said recycle path includes a heat exchanger for further cooling said first predetermined portion of said separated water before providing said separated water to said packed tower.

17. A molten carbonate fuel cell system in accordance with claim 11, wherein said water recovery assembly further comprises a heat exchanger upstream from said first cooling assembly for recovering heat from said anode exhaust before passing said anode exhaust to said first cooling assembly.

18. A molten carbonate fuel cell system in accordance with claim 13, wherein said packed tower outputs separated anode exhaust from said second end after recovering said second portion of water from said anode exhaust, and said fuel cell system further comprises an oxidizer adapted to receive said separated anode exhaust from said packed tower and oxidant gas.

19. A molten carbonate fuel cell system in accordance with claim 18, further comprising a heat exchanger for pre-heating said oxidant gas using said cathode exhaust before supplying said oxidant gas to said oxidizer.

20. A molten carbonate fuel cell system in accordance with claim 14, wherein a portion of said separated water is outputted from said packed tower to said recycle path of said first cooling assembly for mixing with said first portion of water.

21. A method of recovering water from anode exhaust outputted by an anode of a fuel cell comprising:
receiving anode exhaust from said anode in a first cooling assembly;
quench cooling and recovering a first portion of water including electrolyte from said anode exhaust in said first cooling assembly and outputting quenched electrolyte-free anode exhaust and electrolyte-containing water including said first portion of water, wherein said recovering said first portion of water from said anode exhaust comprises passing the anode exhaust through a downward facing path and injecting a predetermined amount of spray water to said anode exhaust in said downward facing path to condense said first portion of water from said anode exhaust;
discharging a portion of the electrolyte-containing water outputted in said recovering step to remove said electrolyte and recycling remaining water outputted from said first cooling assembly for use as spray water in said first cooling assembly;
receiving said quenched anode exhaust from the first cooling assembly in a second cooling assembly comprising a packed tower; and
recovering a second portion of water from said quenched anode exhaust by conveying the quenched anode exhaust through the packed tower, said second portion of water being substantially free of electrolyte and suitable for humidifying fuel supplied to said anode,
wherein the method of recovering water from anode exhaust is performed in a molten carbonate fuel cell system.

22. A method of recovering water from anode exhaust in accordance with claim 21, wherein said recovering said second portion of water comprises passing said quenched anode exhaust from a first end of said packed tower to a second end of said packed tower and passing recycled water from said second end of said packed tower to said first end of said packed tower.

23. A method of recovering water from anode exhaust in accordance with claim 22, wherein said recovering said second portion of water further comprises collecting separated water including said second portion of water from said quenched anode exhaust and said recycled water at or close to said first end of said packed tower and outputting said separated water from said packed tower.

24. A method of recovering water from anode exhaust in accordance with claim 23, further comprising providing at least a portion of said separated water outputted from said packed tower to a humidifier assembly for humidifying said fuel.

25. A method of recovering water from anode exhaust in accordance with claim 23, further comprising recycling a predetermined portion of said separated water outputted by said packed tower to said second end of said packed tower for use as said recycled water.

26. A method of recovering water from anode exhaust in accordance with claim 23, further comprising outputting a portion of said separated water from said packed tower to said recycle path of said first cooling assembly for mixing with said first portion of water.

* * * * *